United States Patent
Schambre

(10) Patent No.: US 7,077,454 B1
(45) Date of Patent: Jul. 18, 2006

(54) VEHICLE SUN-VISOR

(75) Inventor: John E Schambre, Canton, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 11/300,893

(22) Filed: Dec. 15, 2005

(51) Int. Cl.
*B60J 3/02* (2006.01)

(52) U.S. Cl. ............ 296/97.8; 296/97.9; 296/97.11; 296/97.13; 296/214

(58) Field of Classification Search ............... 296/97.1, 296/97.8, 97.9, 97.11, 97.12, 97.13, 1.03, 296/214
See application file for complete search history.

(56) References Cited

U.S. PATENT DOCUMENTS

| | | | |
|---|---|---|---|
| 2,444,524 A * | 7/1948 | Parrish, Jr. ............... | 296/97.11 |
| 4,989,910 A * | 2/1991 | Mersman et al. ........ | 296/97.12 |
| 5,328,227 A | 7/1994 | Pax, Jr. et al. | |
| 5,380,057 A | 1/1995 | Wevers | |
| 5,641,191 A | 6/1997 | Jia | |
| 5,902,002 A | 5/1999 | Wilson | |
| 6,131,986 A | 10/2000 | Rosen | |
| 6,189,947 B1 * | 2/2001 | Annan ..................... | 296/97.12 |
| 6,409,246 B1 * | 6/2002 | Rennie ..................... | 296/97.8 |
| 6,682,122 B1 | 1/2004 | Prokhorov | |
| 6,860,546 B1 | 3/2005 | Fero et al. | |
| 2005/0236864 A1 * | 10/2005 | Asai .......................... | 296/97.8 |
| 2005/0285427 A1 * | 12/2005 | Asai ......................... | 296/97.11 |

FOREIGN PATENT DOCUMENTS

JP         402133227 A  *  5/1990    ................ 296/97.8

* cited by examiner

*Primary Examiner*—Jason Morrow
(74) *Attorney, Agent, or Firm*—Ralph E. Smith

(57) ABSTRACT

A sun-visor is attached to slidably mounted extension rods and is stowed at least partially out of sight, above the headliner, when the sun-visor is not in use. When use of the sun-visor is desired, the sun-visor may be pulled out of the headliner to a position where it may be pivoted downward to block the upper portion of the windshield. A side window sun-visor is pivoted to the sun-visor frame and may be swung outward from the windshield sun-visor to a position where it blocks sun and glare from a side window.

13 Claims, 3 Drawing Sheets

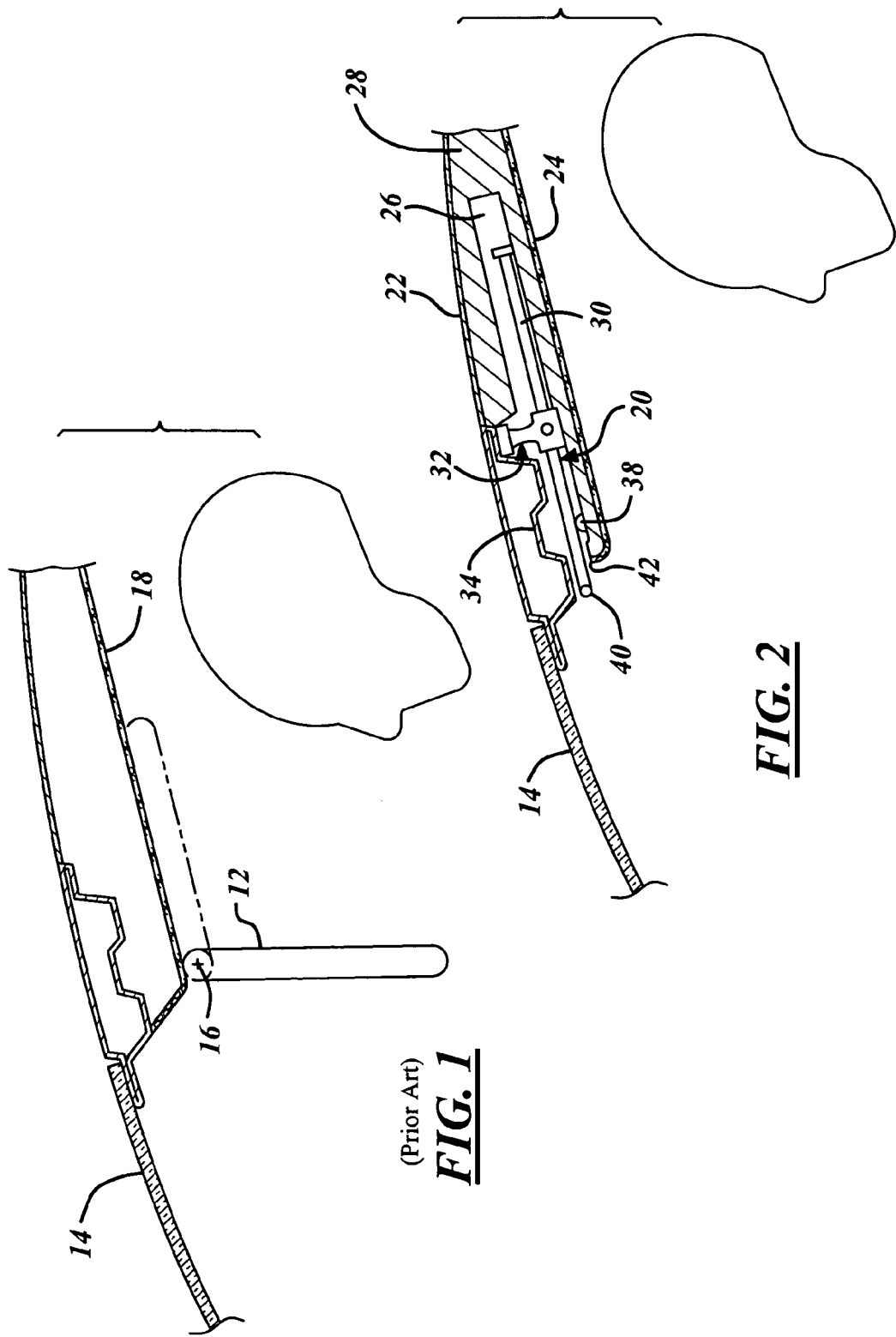

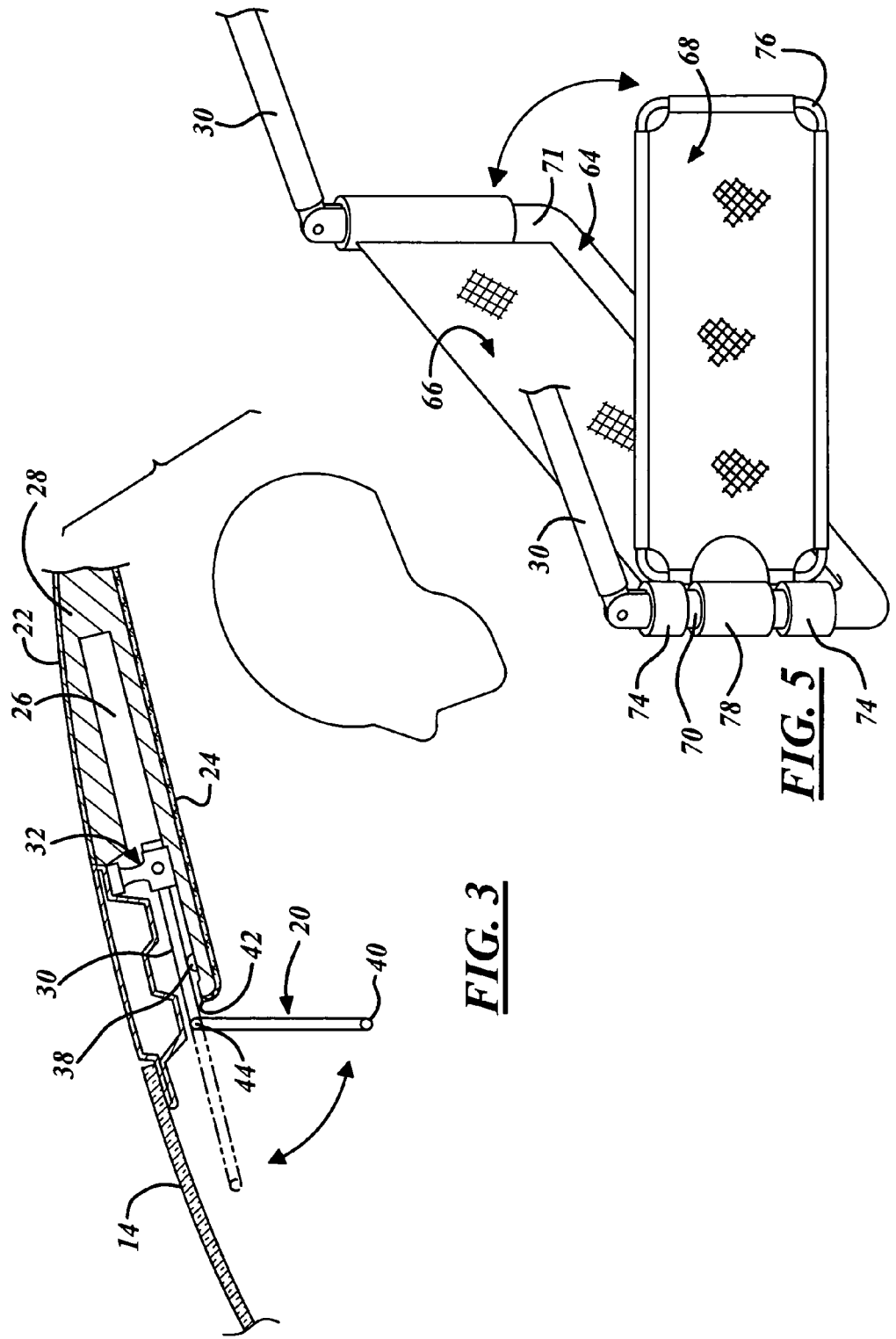

VEHICLE SUN-VISOR

FIELD OF THE INVENTION

The invention relates to a vehicle driving aid and more particularly, a vehicle sun-visor.

BACKGROUND OF THE INVENTION

Prior art automotive sun-visors are often mounted on the surface of the vehicle headliner, adjacent the upper edge of the windshield glass. When not in use, the sun-visor lies against the headliner, within the sight of the occupant. When use is required, the visor pivots downward to block incoming sun and glare. The visor also pivots toward the vehicle side window, providing protection from that direction if required.

SUMMARY OF THE INVENTION

A sun-visor is stowed at least partially above the headliner, when the sun-visor is not in use. The sun-visor is attached to slidably mounted extension rods and when use of the sun-visor is desired, the sun-visor may be pulled out of the headliner, parallel to the windshield, to a position where it may be pivoted downward to block the upper portion of the windshield. A side window sun-visor may be included and in one form, it is pivotally mounted to the sun-visor frame and may be swung outward from the windshield sun-visor to a position where it blocks sun and glare from a side window.

BRIEF DESCRIPTION OF THE DRAWINGS

These and other objects, features and advantages of the present invention will be apparent from the following detailed description of the preferred embodiments and best mode, appended claims and accompanying drawings in which:

FIG. 1 shows a prior art sun-visor;

FIG. 2 is a side view of a new sun-visor in a retracted position;

FIG. 3 is a side view showing the motion of a new sun-visor in an extended position;

FIG. 5 shows the new sun-visor with the side window shield pivoted outward.

DETAILED DESCRIPTION OF PREFERRED EMBODIMENTS

Figure 4:
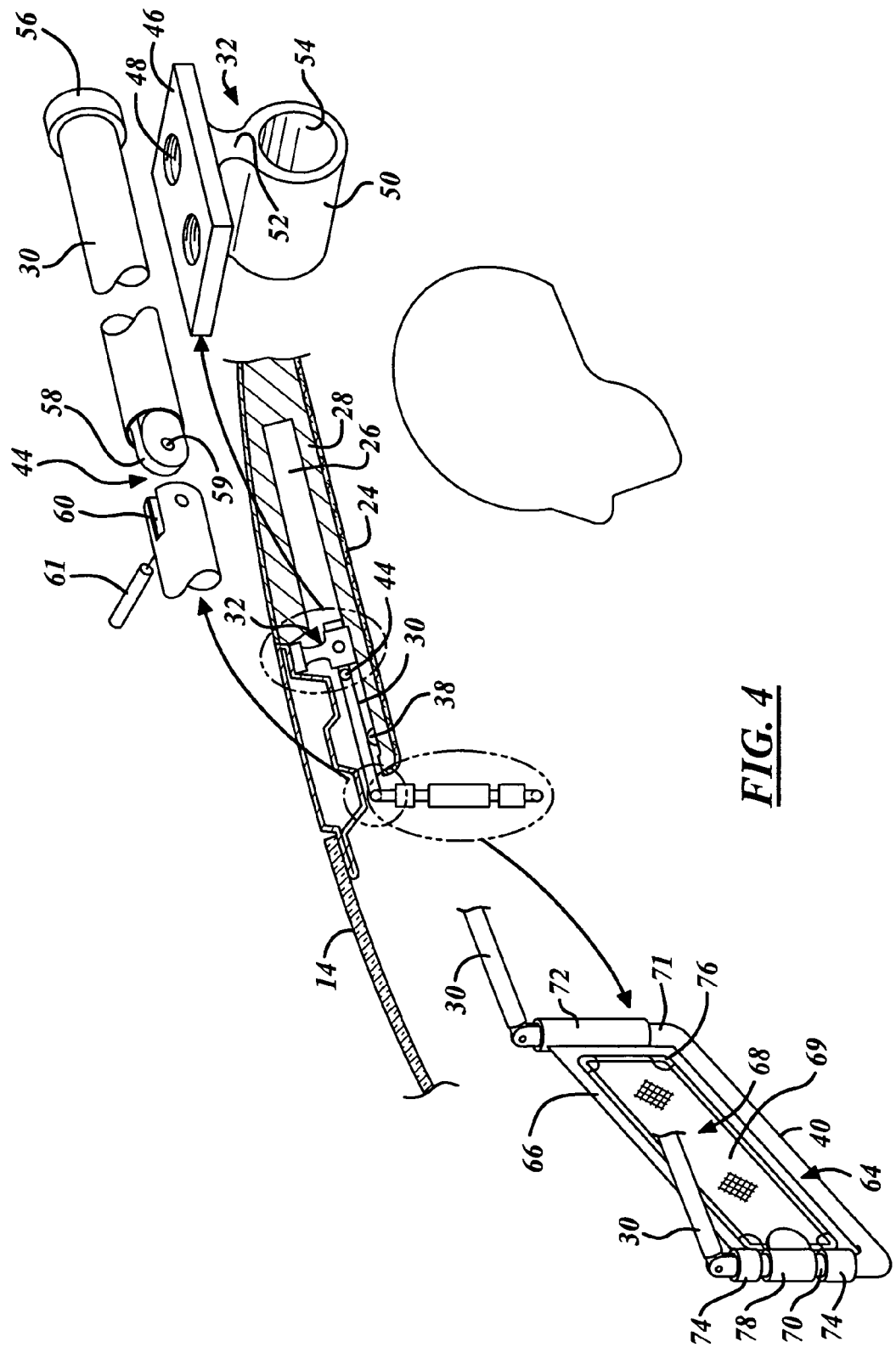
FIG. 4 is a detail view of the elements of the new sun-visor.

FIG. 1 shows a conventional automotive sun-visor according to the prior art. The sun-visor 12 is mounted adjacent the upper edge of the windshield glass 14, and pivots around a rod 16 that is attached to the surface of the headliner 18. When use is required, the sun-visor 12 swings down around the rod 16 to block incoming sun or glare from the windshield 14. The attachment of the rod 16 to the headliner 18 may also be pivoted so that the sun-visor 12 may be swung to a position where the visor blocks sun or glare coming in through the side window.

FIG. 2 shows on presently preferred embodiment of a sun-visor 20 in a retracted position and at least partially disposed between the roof panel 22 and the headliner 24 so that it is out of sight when the visor is not in use. The sun-visor 20 is positioned in a compartment 26 formed in insulation and energy absorbing material 28 that is located between the headliner 24 and the roof panel 22. The sun-visor 20 is mounted on a pair of extension rods 30 that are slidably fitted one each in a pair of mounting blocks 32 (only one extension rod and one mounting block are shown in FIGS. 2 and 3). Each mounting block 32 is secured by adhesive or fasteners or other mounting expedient to a portion of the windshield frame member 34 or other secure fastening point above the windshield 14. The forward end of the sun-visor 20 is supported by a steady rest 38. The leading edge of the sun-visor is formed with a grip portion 40. In the retracted position, the sun-visor is positioned so that the grip portion 40 protrudes slightly beyond an opening 42 formed in the front edge of the headliner 24 so that it is accessible to a vehicle occupant.

FIG. 3 shows the downward pivoting motion of the sun-visor 20 in the extended position. The extension rods 30 are fully extended from the mounting blocks 32. A pivot coupling 44 connects each extension rod 30 to the sun-visor 20 to allow downward swinging motion of the sun-visor when the sun-visor 20 is extended to a position that is beyond the opening 42 in the headliner 24.

FIG. 4 shows the details of construction of the sun-visor. Each mounting block 32 comprises base plate 46 with mounting apertures 48 for receiving fasteners such as screws or rivets (not shown). A support sleeve 50 is coupled to the base 46 by a web portion 52. The support sleeve 50 has a bore 54 which slidingly receives one of the extension rods 30. The mounting blocks 32 may be fabricated from plastic, or other suitable material. An end stop 56 is formed or mounted on one end of each extension rod 30 to prevent the extension rods form being pulled all of the way through the bore 54 of the support sleeve 50 when the sun-visor is moved to the extended position. The opposite end of each extension rod is formed with a tongue 58 that has a pivot pin receiving hole 59 formed therein.

The sun-visor comprises a U-shaped frame 64 that supports first and second visor panels 66 and 68. The ends of the arm portions 70, 71 of the U-shaped frame are formed with a groove 60 that is dimensioned to receive the tongue 58 of the extension rods. A pivot pin 61 secures the tongue 58 in the groove 60 so that the U-shaped frame 64 may pivot relative to the extension rods 30. The first or windshield visor panel 66 comprises opaque material 66 that extends between the arm portions 70, 71 of the U-shaped frame. The ends of the windshield visor panel 66 may be formed with loops that encircle the arm portions 70 of the U-shaped frame 64 to mount the windshield visor panel 66 thereon. The inboard end of the windshield visor panel has a large loop 72 that encircles the inboard arm 71 and the outboard end of the windshield visor panel has two small spaced loops 74 that encircle the outboard arm 70. A second or side window visor panel 68 comprises a rectangular frame 76 that supports a panel 69 of opaque material.

The side window visor panel 68 is attached by a mounting collar 78 to the outboard arm 70 of the U-shaped frame 69. The mounting collar 78 frictionally engages the outboard arm 70 so that the mounting collar and the side window visor panel 68 may be pivoted relative thereto. The side window visor panel 68 may alternatively comprise a single self-sustaining rectangular panel that is mounted on the outboard arm 70 of the U-shaped frame 64 by means of the mounting collar 78.

A steady rest 38 is located along each extension rod 30 spaced from the mounting block 32. Each steady rest 38 may comprise one or more ribs that are molded into the headliner or the energy absorbing material 28 that do not impede the sliding motion of the extension rods. The steady rests may alternatively take the form of separate spring loaded clips (not shown) that will maintain constant contact with the sun visor 20 both in the retracted position and in the extended position. The steady rests 38 prevent droop in the extension rods 30 when the extension rods are extended from the mounting blocks 32, and support the extension rods against the torque forces that are generated when the sun-visor is pivoted to the down position. In addition to providing support, the steady rests also reduce the vibration of the sun visor assembly 20.

FIG. 5 shows the side window visor panel 68 pivoted out from the windshield visor panel 66.

In operation, the sun-visor is normally stored at least partially, and preferably substantially, out of sight between the headliner 24 and the roof panel 22 of the vehicle. When the occupant of the vehicle desires to block a portion of the windshield with the sun-visor, the occupant engages the grip portion 40 of the U-shaped frame 64 and pulls the sun-visor out of the compartment 26 and parallel to the windshield until the stops 56 on the end of the extension rods 30 come into contact with the support sleeve 50 of the mounting block. This positions the pivot couplings 44 in front of the opening 42 in the headliner so that the sun-visor may be pivoted downward to a desired position. Also if desired, the side window visor panel 68 may be pivoted outward toward the side window of the vehicle to block sun or glare from the side window while the windshield visor panel is used to block sun or glare from the windshield.

In a crash event, the sun-visor is part of the energy absorbing management system formed by the insulation material 28. The web portion 52 of the mounting block 32 is designed to fracture during a head impact to provide additional energy absorbing management.

Having thus described the invention, various modifications and alterations will occur to those skilled in the art, which modifications and alterations are within the scope of the invention as defined by the appended claims.

What is claimed is:

1. A sun-visor for a vehicle having a windshield, a roof, and a headliner covering the inside of the roof, the sun-visor comprising:
   a pair of mounting blocks secured to a structural member behind the headliner;
   a pair of extension rods slidably mounted in the mounting blocks;
   a sun-visor coupled to the extension rods by a pair of pivots;
   the sun-visor comprising a first visor panel and a second visor panel, the first visor panel being pivoted to the extension rods by the pair of pivots, and the second visor panel being pivoted to the first visor panel, whereby the position of the extension rods may be adjusted in the mounting blocks from a retracted position in which the sun-visor is out of sight behind the headliner to an extended position in which the sun-visor can be pivoted to a position in front of the windshield;
   a U-shaped frame for mounting the first visor panel to the extension rods; and
   the second visor panel being mounted to one of the arms of the U-shaped frame.

2. The sun-visor as claimed in claim 1 further comprising:
   a mounting collar mounted on the U-shaped frame, the second visor panel being secured to the U-shaped frame by the mounting collar.

3. The sun-visor as claimed in claim 2 further comprising:
   the second visor panel being pivoted to the first visor panel so that the second visor panel may be used to block sun and glare from the side window of the vehicle while the first visor panel is used to block sun and glare from the windshield of the vehicle.

4. The sun-visor as claimed in claim 1 further comprising:
   a front opening in the headliner for allowing access to the sun-visor in the retracted position; and,
   a steady rest for each extension rod, each steady rest being located between the mounting block and the front opening, the steady rest providing support for the extension rods.

5. The sun-visor as claimed in claim 1 further comprising:
   a front opening in the headliner for allowing access to the sun-visor in the retracted position; and,
   a steady rest for each extension rod, each steady rest being located between the mounting block and the front opening, the steady rest providing vibration damping for the sun-visor.

6. The sun-visor as claimed in claim 4 further comprising:
   a bore in each mounting block for receiving an extension rod; and,
   an end stop on the end of each extension rod, the end stop being larger in diameter than the diameter of the bore, whereby the end stop prevents the extension rod from being pulled out of the mounting block.

7. The sun-visor as claimed in claim 4 further comprising:
   a base and a support sleeve comprising each mounting block, the bore in each mounting block being formed in the support sleeve; and,
   a web portion coupling the support sleeve to the base, the web portion being designed to fracture during a head impact to provide energy absorbing management in a crash event.

8. The mounting arrangement for a sun-visor as claimed in claim 1 further comprising:
   a grip portion defined on the sun-visor, the grip portion being accessible to an occupant when the sun-visor is in a retracted position, whereby the sun-visor can be extended from a retracted position to an extended position by engaging the grip portion and extending the sun visor parallel to the windshield.

9. A sun-visor for a vehicle having a windshield, a roof, and a headliner covering the inside of the roof, the sun-visor comprising:
   a pair of mounting blocks secured to a structural member behind the headliner;
   a pair of extension rods slidably mounted in the mounting blocks;
   a sun-visor coupled to the extension rods by a pair of pivots;
   a U-shaped frame for mounting the sun-visor to the extension rods;
   a grip portion on the U-shaped frame, whereby the grip portion may be used to withdraw the extension rods from a retracted position in which the sun-visor and the pivots are out of sight behind the headliner to an extended position in which the sun-visor and the pivots are in a position in front of the headliner so that the sun-visor can be pivoted to a position in front of the windshield.

10. The sun-visor of claim 9 further comprising:
    a steady rest for each of the extension rods, the steady rest for each extension rod being positioned out of sight, behind the headliner, wherein each steady rest provides support for an extension rod and helps to prevent extension rod droop.

11. The sun-visor of claim 9 further comprising:

a first visor panel and a second visor panel comprising the sun-visor, the first visor panel being coupled to the extension rods through the pair of pivots, the second visor panel being pivoted to the first visor panel.

12. The sun-visor of claim 11 wherein the second visor panel may be pivoted to a position to block sun and glare coming from the direction of a side widow of the vehicle while the first visor panel is pivoted to a position to block sun and glare coming from the windshield of the vehicle.

13. The sun-visor of claim 9 further comprising:

a bore in each mounting block for receiving an extension rod; and, an end stop on the end of each extension rod, the end stop being larger in diameter than the diameter of the bore, whereby the end stop prevents the extension rod from being pulled out of the mounting block.

* * * * *